J. L. POPE.
Drive Chain.

No. 241,717.  Patented May 17, 1881.

Witnesses:
P. Firbert Nagle
Alex. Scott

Inventor.
John L. Pope
By atty.
J. Mac Pietrie

N. PETERS, Photo-Lithographer, Washington, D. C.

UNITED STATES PATENT OFFICE.

JOHN L. POPE, OF CLEVELAND, OHIO.

DRIVE-CHAIN.

SPECIFICATION forming part of Letters Patent No. 241,717, dated May 17, 1881.

Application filed May 16, 1879.

*To all whom it may concern:*

Be it known that I, JOHN L. POPE, of Cleveland, in the county of Cuyahoga and State of Ohio, have invented certain new and useful Improvements in Drive-Chains, of which the following, in connection with the accompanying drawings, forming a part hereof, is a full, clear, and exact description.

Figure 1:
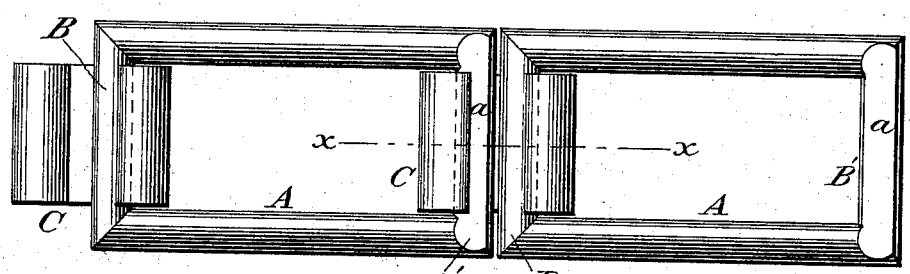
Figure 2:
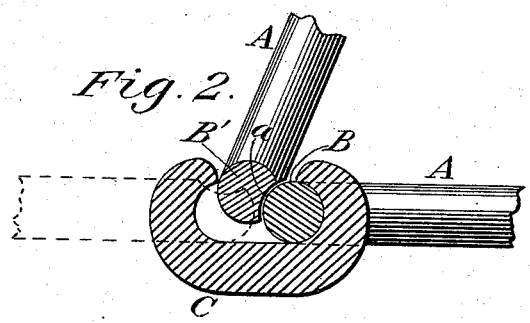
Figure 3:
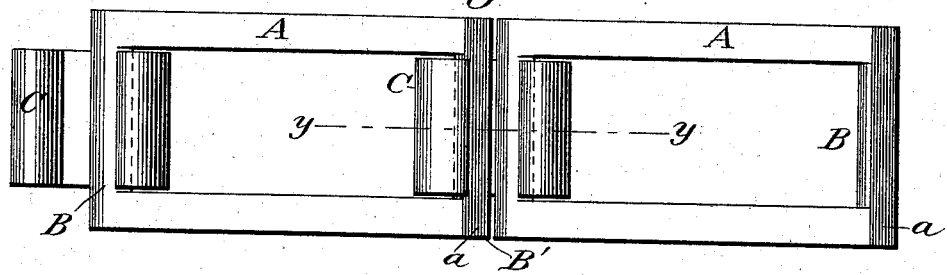
Figure 4:
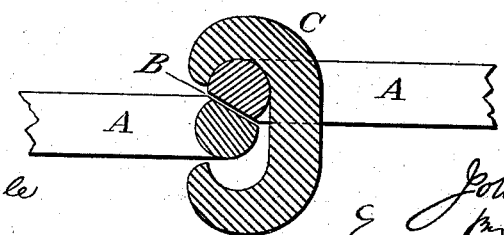

In the drawings, Figure 1 is a plan view of coupled links of a detachable drive-chain embodying my invention. Fig. 2 is a section of the same at line $x\ x$. Fig. 3 is a plan view, showing a mere modification of the means employed for connecting the links detachably; and Fig. 4 is a section in the plane of the line $y\ y$, Fig. 3.

Like letters of reference indicate the same parts in different views.

My invention relates to that class of drive-chains wherein the links are adapted to engage sprocket-wheels, and are so connected or articulated as to be prevented from being accidentally detached from each other, and yet capable of being detached at will with facility, and again connected so that the chain may be easily made either longer or shorter and the links be interchangeable, and to that species of said class in which the chain is composed of open links and coupler devices or connecting sections arranged alternately.

The object of my invention is to provide this species of chains with an improved means for connecting the links in such a manner that while the chain will possess the advantages already referred to it shall have the capacity for a designed detachment (or uncoupling) of the parts without the necessity of having anything like so much slack in the chain as is necessary in all previous constructions of chains of this species that I know of; and to this end and object my invention consists of certain novel features of construction, substantially such as will be hereinafter set forth, and more specifically pointed out in my claim of invention, and which I employ for the purpose of effecting the articulation of the parts, so that they may be detached, as just mentioned, without much slack in the chain.

In the drawings, A A represent the links, which may be made open or otherwise, so as to engage the sprockets or other engaging-wheels employed in connection with chains for the purpose of communicating motion from one part of a machine to another or from one machine to another in the manner well known and needing no description here, my invention not relating to the general form of the link, but, as aforestated, to those features of construction only which relate to the articulation of the parts of the chain.

B and B are the end bars of the link.

The essential feature of my invention so far as relates to the construction of the link consists in making either one or both of the end bars of each link with a longitudinal depression or flattened place along one of its outer faces, as shown at $a$, so that the said depressed or flattened part of one link will not be in contact with the end bar of the other link when both are in the coupler and lie in the same horizontal plane and end to end, or, in other words, when the coupled parts are in a working position, as shown in Figs. 1 and 3. To produce this contraction or depression in the end bars I either make in one of them a curvilineal groove, as is clearly indicated in Fig. 2, or else bevel off the opposite faces of both, as represented in Fig. 4, thus in either case causing the sum of the diameters of the contiguous end bars to be either greater or less, according to the position in which the links may be relatively placed in the coupler, or, in other words, causing the sum of the diameters of the bars to occupy more or less space within the coupler at one time than at another, accordingly as the links and coupler may be relatively placed, as will hereinafter more fully appear.

C is a coupler, made separately from the links and of a C-shaped form, about as usual. This coupler consists, as shown, of a piece having its ends curved over or in toward each other. (See Figs. 2 and 4.) The greatest interior distance between the curved parts of the coupler is such as to accommodate the contiguous end bars of the links snugly when the links are arranged horizontally, as indicated by the dotted lines in connection with the full lines in Fig. 2, and the smallest distance or the opening between the curved parts of C may be much less than the shortest distance diametrically across the end bars—that is, the sum of their diameters when the contracted part on one bar is in contact with the other, or the contracted parts of each are in contact, as the case may be, and as shown in Figs. 2 and 4, respectively.

It will be perceived by reference to Figs. 2 and 4 that while the links and couplers, when constructed substantially as herein described, may be connected together removably in such a way as to form free working joints or hinge-like articulations, and will not be liable to become unjointed accidentally, they will be capable of designed detachment by simply turning any two links and their connecting coupler device into such relative position that, (as shown, for instance, at Fig. 4,) while the end bar of one link occupies its seat or bearing in one end of the C-shaped coupler C, the end bar of the other link may be moved away from its seat in the coupler, and can then easily be passed laterally through the opening or throat of the coupler, thus rendering possible a detachment of the parts of the chain with only an amount of slack requisite to permit the turning of the parts into the position described. The amount of slack requisite to thus place the parts is, it will be seen, about equal only to the diameter of an end bar of a link, and is therefore exceedingly small as compared with the amount of slack necessary to effect the detachment of the parts in this species of chain as constructed prior to my invention.

Of course, after the removal of the end bar of one link from the coupler the other may be easily extricated therefrom.

What I claim as of my invention, and desire to secure by Letters Patent, is—

A detachable drive-chain composed of alternately-arranged links and C-shaped coupler devices, substantially such as described, and having either one or both end bars of each link formed with a flattened portion or depression, all substantially in the manner and for the purpose set forth.

JOHN L. POPE.

Witnesses:
OTTO ARNOLD,
D. J. BARNES.